US012659405B1

(12) United States Patent
Saussy et al.

(10) Patent No.: US 12,659,405 B1
(45) Date of Patent: Jun. 16, 2026

(54) GLOBAL ROUTING IN MULTI-TENANT CLOUD BASED CONTACT CENTER

(71) Applicant: Amazon Technologies, Inc., Seattle, WA (US)

(72) Inventors: Juliana Saussy, Woodland Hills, CA (US); Joseph Sullivan, Seattle, WA (US); Richard Julian Rodriguez, Coral Gables, FL (US); Jyoti Kadian, Seattle, WA (US); Jatin Vinubhai Bhikadiya, Seattle, WA (US); Sonu Kumar Mishra, Seattle, WA (US); Jaswinder Singh Randhawa, Bothell, WA (US); Vamsi Polapragada, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 18/375,402

(22) Filed: Sep. 29, 2023

(51) Int. Cl.
    *H04M 3/42* (2006.01)
    *H04M 3/51* (2006.01)
    *H04M 3/523* (2006.01)

(52) U.S. Cl.
    CPC ... *H04M 3/42374* (2013.01); *H04M 3/42357* (2013.01); *H04M 3/5191* (2013.01); *H04M 3/5237* (2013.01)

(58) Field of Classification Search
    None
    See application file for complete search history.

(56) References Cited

U.S. PATENT DOCUMENTS

| | | | |
|---|---|---|---|
| 6,614,902 B1 * | 9/2003 | Rizzetto | H04M 7/128 379/220.01 |
| 2009/0182885 A1 * | 7/2009 | Sang | G06F 3/0484 709/228 |
| 2010/0054448 A1 * | 3/2010 | Townsend | H04M 3/5237 379/265.02 |

* cited by examiner

*Primary Examiner* — Hemant S Patel
(74) *Attorney, Agent, or Firm* — Davis Wright Tremaine LLP

(57) ABSTRACT

System and methods are described to connect an agent of one region to a contact request in another region via a proxy service. In some examples, a first contact service instance of a first region may obtain a contact request from a contact requestor, where the contact request includes a set of attributes. The first contact service instance selects an agent of a second contact service instance of a second region to process the contact request, whereby a proxy service of the first contact service instance sends a request to the second contact service instance to release the agent to process the request. The first contact service instance/proxy service may obtain an indication that the agent is approved to process the contact request. The first contact service instance may then connect the contact requestor and the agent to process the contact request.

20 Claims, 9 Drawing Sheets

700

Obtain, by a first contact service instance associated with a first region of a contact service, a contact request associated with a contact requestor located with the first region ⎫ 702

Upon selecting, by the first contact service instance, an agent associated with a second contact service instance associated with a second region to process the contact request based on the attributes of the contact request, send a request to the second contact service instance to release the agent to process the request ⎫ 704

Obtain, by the first contact service instance, an indication from the second contact service instance that the agent associated with the second region is approved to process the contact request ⎫ 706

Cause, by the first contact service instance, a communication channel to be established between the contact requestor in the first region and the agent in the second region to process the contact request ⎫ 708

300a

Instance A, Region X 302

Contact Trace Record Event Stream 328

Contact Event Stream 330

Configuration Service 332

Contact Trace Record 324

Contact Management 322

Flow Execution 320

Routing 318

356

Agent Management Service 334

Agent Management 336

Agent Management Proxy 338

360

To Agent Management Proxy of instance B in Region y 362

358

354

344

346

348

Contact Service 306

340

Media Services 308

Voice/ telecom 310

Chat 312

Work Item 314

Task 316

350

352

304

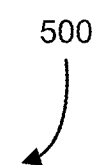
500
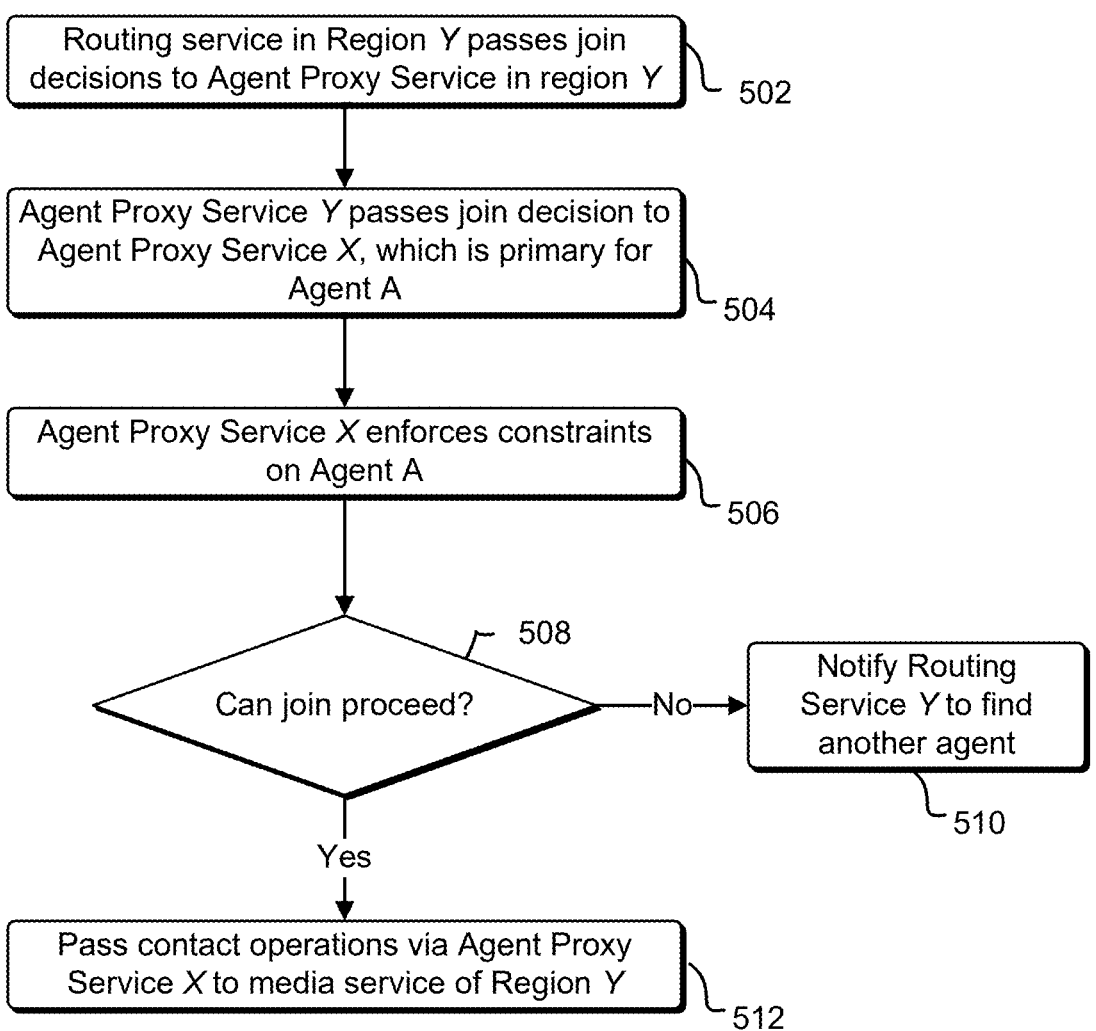
FIG. 5

700

Obtain, by a first contact service instance associated with a first region of a contact service, a contact request associated with a contact requestor located with the first region ⸗ 702

Upon selecting, by the first contact service instance, an agent associated with a second contact service instance associated with a second region to process the contact request based on the attributes of the contact request, send a request to the second contact service instance to release the agent to process the request ⸗ 704

Obtain, by the first contact service instance, an indication from the second contact service instance that the agent associated with the second region is approved to process the contact request ⸗ 706

Cause, by the first contact service instance, a communication channel to be established between the contact requestor in the first region and the agent in the second region to process the contact request ⸗ 708

FIG. 7

GLOBAL ROUTING IN MULTI-TENANT CLOUD BASED CONTACT CENTER

BACKGROUND

The use of contact centers, to route different communications channels, including text, audio, and video, to customer service agents is increasing rapidly. Typically, these contact centers provide for various routing configurations or routing profiles to provide better customer service by connecting customers with agents qualified to handle certain types of requests and in a timely manner. Different queues may be used, such as having different priority levels, to help facilitate prioritizing different types of requests, which may be staffed by any number of agents.

Currently, global companies have a need to staff contact center agents around the world to handle customer inquiries that can come in at any time of day or night. To provide great customer service while maximizing productivity and efficiency, some companies would prefer to set up a single global contact center, where any agent across their global workforce can be offered a contact (e.g., call, chat, or task) from anywhere in the world as long as they have the availability and the appropriate skills to resolve the customer issue. Simultaneously, companies want to operate their infrastructure across multiple geographical regions in order to achieve redundancy and mitigate the risk of any region-wide issue, since even minutes of downtime to critical customer service workloads can cause millions of dollars of impact. However, addressing both these requirements using a single global contact center architecture is difficult and expensive to do today, because depending on where they operate, companies must additionally adhere to diverse data sovereignty requirements such as ensuring that German customer data is stored in the EU while Canadian customer data is stored in Canada, which is not possible to implement without significant custom development cost. Instead, companies today often set up siloed regional contact centers, which enables them to address data sovereignty and regional redundancy requirements but limits them from fully utilizing their global workforce, resulting in labor inefficiencies and risking negative customer experience.

BRIEF DESCRIPTION OF THE DRAWINGS

Various techniques will be described with reference to the drawings, in which:

FIG. 5 illustrates an example process for linking a contact service agent in one region to a contact request origination in another region according to at least one embodiment;

FIG. 7 illustrates another example process for linking a contact service agent in one region to a contact request origination in another region according to at least one embodiment.

DETAILED DESCRIPTION

Figure 1:
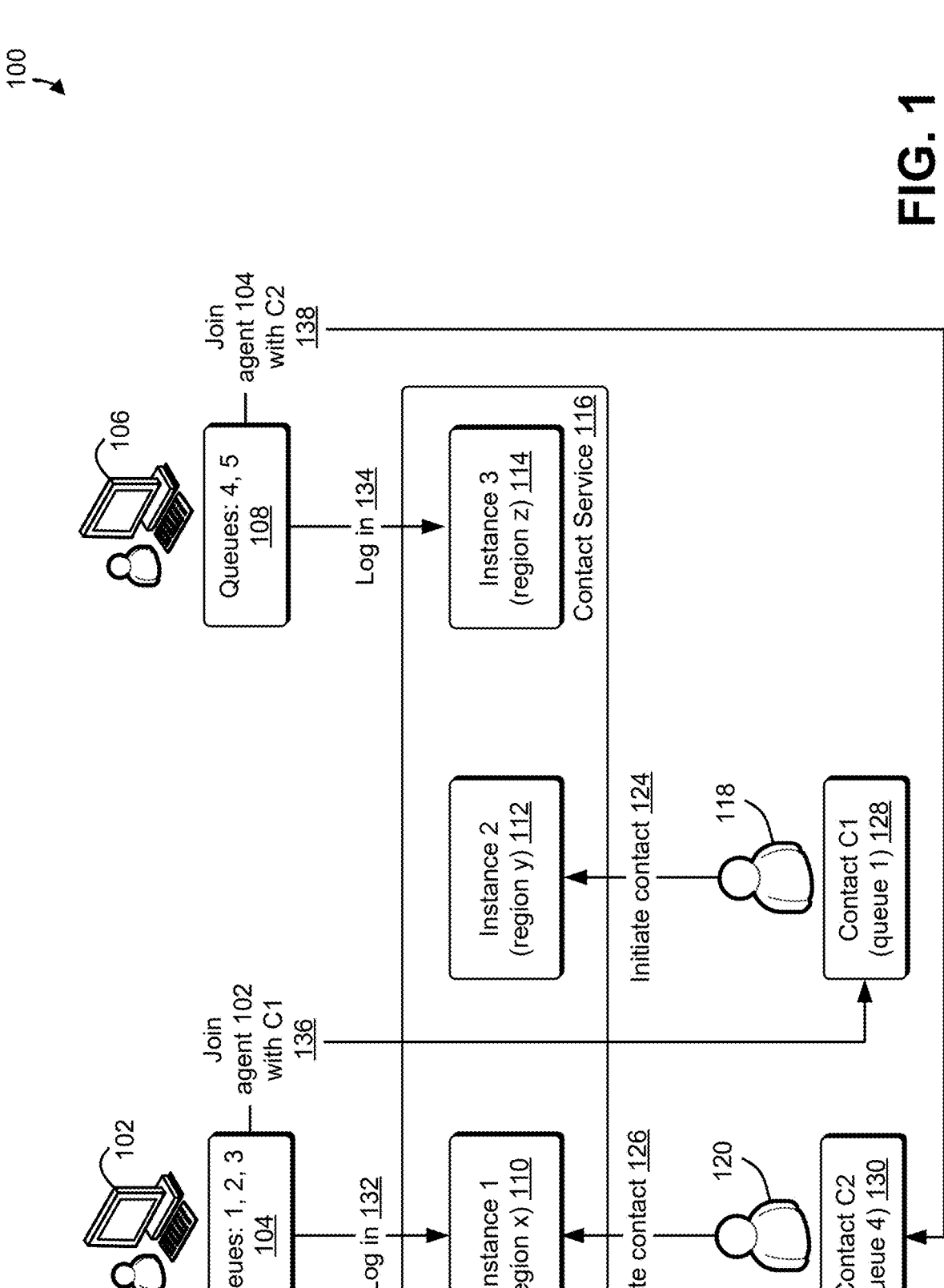
FIG. 1 illustrates an example of routing and connecting agents to contacts within different regions of a contact service, according to at least one embodiment.

Systems and methods are described herein for improving resource allocations by linking agents across different regions of a contact service to respond to contact requests across these different regions. With existing architectures, if one regional contact center is receiving higher than expected contact volume, customers in that region are forced to wait until an agent in the same region becomes available, even if there are qualified agents sitting idle in a different region. Because companies want to ensure there are always sufficient agents available to meet projected contact volume regardless of region, companies who set up siloed regional contact centers may end up overstaffing agents for each region, resulting in millions of dollars of additional labor cost that could be saved if agents could be shared across regions. Alternately, in some cases companies may try to leverage their global workforce by having contact center managers manually monitor incoming contact volume in each region throughout the day and reactively request agents to log in and out of different regions to follow the traffic. Unfortunately, this manual process is both difficult and error prone, since contact center managers must now reconcile disparate data across multiple regions to determine which regions are currently at greatest need for more agents, and agents must now log in and out of multiple different interfaces to firefight contact volume that fluctuates throughout the day depending on time zone.

The described techniques, referred to as global routing, provide for companies to leverage their global workforce by offering each contact to the best available agent with the right matching skillsets and proficiencies to resolve that contact quickly, regardless of which region the agent is logged into, while still getting the benefits of regional redundancy and data sovereignty by storing contact data in the region where the contact was initiated. The described systems and methods may utilize an agent management proxy service or system associated with each region/contact service instance in a region to publish and update agent information (availability, profiles, routing profiles, etc.), and make determinations as to enabling agents to respond to contact requests from different regions. In some cases, each region or contact service instance may have its own proxy service, to provide a distributed solution to global agent routing. In this way, existing architectures may be used and harnessed to route agents between different geographical regions, while still enabling agent routing decisions to be retained by the responsible routing service.

In one example, a first agent management proxy service may be instantiated in a first contact service instance in a first geographical region. The first agent management proxy service may obtain, from a second agent management proxy service associated with a second contact service instance in second geographical region of the contact service, a contact request associated with a contact requestor located with the second geographical region. The contact request may include a set of attributes that define the request, and may include a task, a question, etc., requiring various skillsets to resolve by an agent. In some cases, a routing service of the second contact service instance may determine that a first agent associated with the first region satisfies a set of criteria to respond to the contact request based on the attributes of the contact request. The routing service of the second contact service instance may assign the contact request to a first queue in the second region based on a routing profile of the first agent satisfying the attributes of the contact request. The second agent management proxy service may communicate to the first agent management proxy service to request that the first agent be released/assigned to the contact in the second region. The agent management proxy service in the first region may then relay the request to an agent management service in the first region, that may make decisions regarding assigning agents associated with the first region. The agent management service/proxy service of the first region may then communicate with the agent management proxy service of the second region to establish a communication channel between the agent in the first region and the contact in the second region to process the contact request in the first queue. As these are cross-region interactions, these communications may be handled and routed through the agent management proxy services in the first region and the second region.

In some cases, in processing the contact request, the agent management proxy service may access account data associated with the contact request from a data store associated with the second geographical region to comply with at least one data sovereignty requirement associated with the second geographical region. In some examples, the set of criteria for pairing an agent/queue with a contact request may include a latency requirement for responding to the contact request, an arbitration criteria for negotiating assigning agents of the first geographical region to contact requests originating from the second geographical region, or a combination thereof.

In some cases, the first agent management proxy service may communicate updates and state changes for one or more agents managed by the first agent management service in the first geographical region to an agent management service of a second region, through a second agent management proxy service associated with the second region. In yet some cases, the first agent management proxy service, upon receiving an update to at least one agent managed by the agent management service in the first geographical region, may additionally or alternatively, publish the update to an interface shared between the first agent management service and the second agent management service to enable the first routing service and the second routing service to assign the at least one agent to a queue in at least one of the first geographical region or the second geographical region. In yet some cases, the first agent management proxy service may periodically broadcast a list of available agents associated with the first geographical region to the second agent management service via the second agent management proxy service. In some or all of these ways, the described techniques may enable an agent of a particular geographic region to become in essence a global agent capable of responding to contact requests from the geographical span of a given customer.

In some cases, the described techniques may enable companies or customers of a contact service to be able to maintain the ease of use of managing a single region with no or minimal additional development costs and resources. The described techniques may provide call quality and/or latency as within a single region, but enable better sharing and utilization of agent resources to efficiently process contact requests. In some aspects, contact center agents may use a single unified agent interface, but can be offered contacts from any region depending on where their skillsets are most needed. In some examples, contact center managers and workforce analysts will be able to monitor key operational metrics across their worldwide operations in a single global dashboard that spans their contact center activity across all regions, rather than reconciling multiple disparate dashboards. Because customer data will still be stored in the region that the contact originated in, companies will continue to meet their data sovereignty requirements at greatest fault tolerance, while optimally utilizing their global workforce.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) more efficient utilization of computing resources and human resources in allocating agents to process contact requests in different regions; (2) reduction in wait times for resources to be allocated to process requests in a different regions; and (3) other benefits and advantages as will be described and made apparent in the description below.

FIG. 1 illustrates an example 100 of routing and connecting agents to contacts within different regions of a contact service. As illustrated, a contact service 116 may include different contact service instances 110, 112, 114, each associated with a different geographical region x, y, z. Each instance 110, 112, 144 may include computing resources that receive contact requests and route the contact requests to different queues for contact service agents to process. Each instance 110, 112, 114 may be associated with a different region (e.g., geographical region) or coverage zone. In various cases, the regions covered by the different instances may include distinct, non-overlapping areas (e.g., West Coast USA, East Coast USA, Europe, etc.). In these examples, the regions may be based on the location of physical computing resources (e.g., servers, data centers, etc.) and population centers adjacent or proximate to the computing resources, such that certain service levels (service level agreements for bandwidth, throughput, etc.), may be provided for some or all customers within a given region. In other cases, regions may be at least partially overlapping, for various reasons. Via the techniques described herein, contact center administrators will be able to choose which regions they want to route to, and agents in those region become part of their global workforce. Once initial set-up (phone number, contact flow etc.) is complete, agents can log into a single agent interface and immediately start taking contacts from any region.

For example, as illustrated, agents 102, 106 may login to their respective contact service regions/instances 110, 114, respectively, via operations 132, 134. Various contacts C1 and C2 118, 120 may submit requests/initiate 124, 126 contact with the contact service 116. Based on the requests, 124, 126, the different contacts 118, 120 may be placed into different queues, such as queues 128, 130, with the instance in the region where the contact is located. In one example contact request 126 from C2 120 may be placed in a payment queue (queue 4), based on the request 126 pertaining to a payment issue or task. Similarly, contact request 124 from C1 118 may be placed in a sales queue (queue 1) based on the request 124 pertaining to a sales related issue or task. As illustrated agent 102 logged into instance 1 110 of region x may only support processing requests/tasks in queues 1, 2, and 3, while agent 106 logged into instance 3 114 of region z may only support processing requests/tasks in queues 4, and 5. Based on existing contact center routing processes, contact C2 120 and contact C1 118 may have to wait until agents in their respective regions x and y who are qualified to handle the requests are available, before their requests can be processed.

However, using the described techniques, an agent management proxy service, of each of the regions/instances 110, 112, 114 may enable agents 102 and 106 to handle contact requests 124, 126 from different regions. For example, instance 2 112 (e.g., a routing service of instance 112) may query instance 1 110 (e.g., via a proxy service of instance 111) to see if agent 102 can handle request 124 from contact C1 118, as agent 102 is qualified to handle contact request in queue 1. If instance 1 110 determines to release agent 102 to handle request 124, then instance 1 110 may join agent 102 with contact C1 128, at operation 136. Similarly, instance 1 110 (e.g., a routing service of instance 110) may query instance 3 114 (e.g., via a proxy service of instance 114) to see if agent 106 can handle request 126 from contact C2 120, as agent 106 is qualified to handle contact request in queue 4. If instance 3 114 determines to release agent 106 to handle request 126, then instance 3 114 may join agent 106 with contact C2 130, at operation 138.

Figure 2:
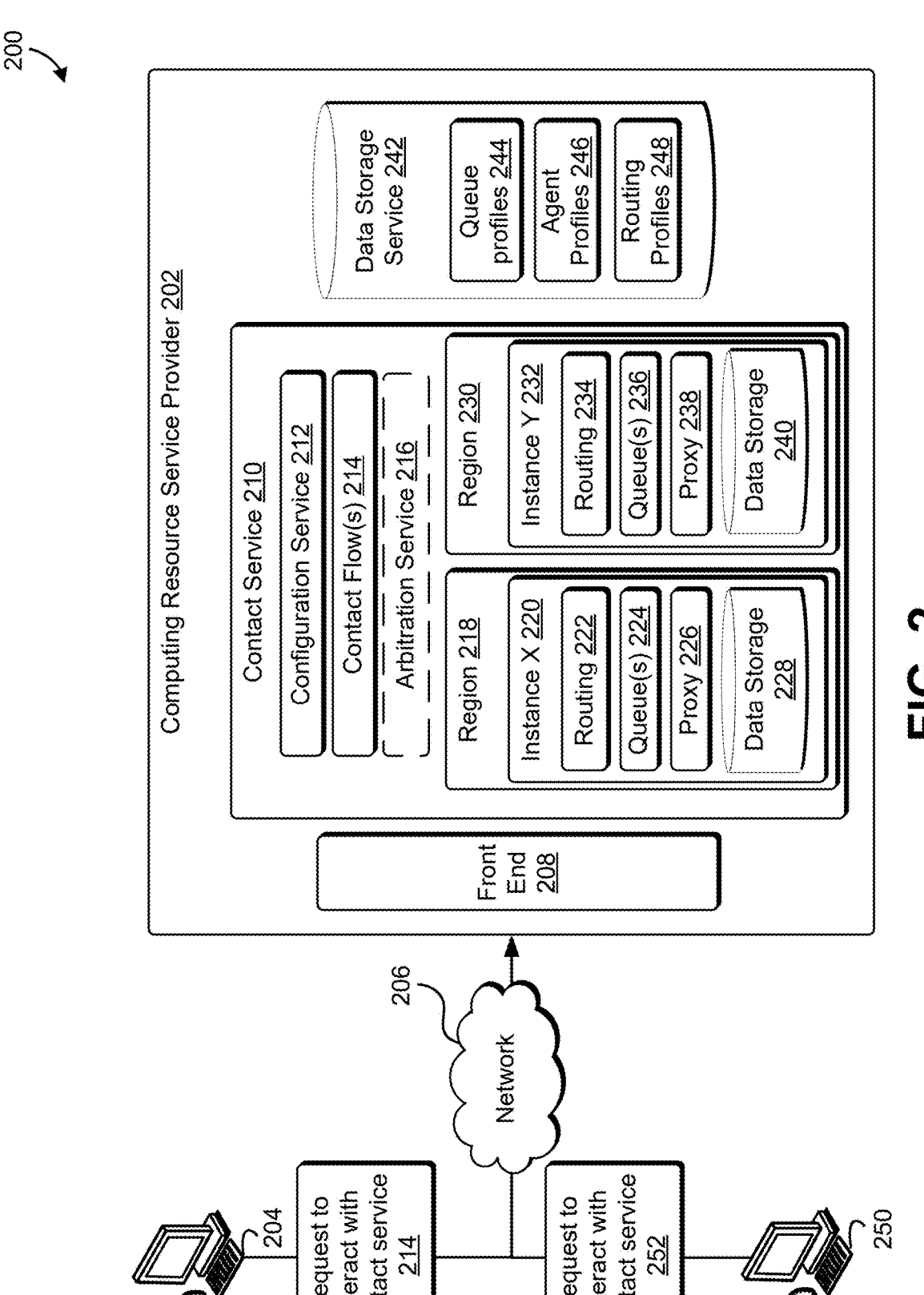
FIG. 2 illustrates an example environment in which the described techniques can be practiced, according to at least one embodiment.

FIG. 2 illustrates an example environment 200 in which contact service 210 may include one or multiple agent management proxy services 226, 238 (referred to as proxy services for short) for different regions 218, 230 served by the contact service 210. As illustrated, the contact service 210 may be provided by a computing resource service provider 202. In some cases, each region 218, 230 may be served or associated with one or more contact service instances, such as instance x 220 and instance y 232, respectively. As illustrated, some computing resources or components may be shared by one or more instances 220, 232, such as data storage 242, front end 208, and/or one or more of the configuration service 212, contact flows 214, and/or arbitration service 216 (dashed lines indicate an optional component). In other cases (not illustrated), each instance 220, 232 may include some or all components of the contact service 210, such as distinct instances of data storage 228, 240, which may be an example or replica of data storage service 242. In some examples, one instance 220 in region 218 may be replicated or substantially duplicated and instantiated in a different region 230 as instance 232, to enable various data and other processes and configurations to be shared among the different instances 220, 232, to enable sharing of queue, agent, and/or routing profiles 228, 236, 238, to enable the techniques described herein.

The contact service 210 may interact with various other computer-implemented services, such as one or more of a front end 208, and/or a data storage service 242 to route customer requests to various queues and assign agents to those queues, as will be described in greater detail below. Various client computing devices 204, 250 may interact with the computing resource service provider 202 through one or more networks 206 to access this functionality.

Client 204 may refer to a client computer system or computing device connected to a server (e.g., computing resource service provider) over a network 206. In some cases, client 204 refers to a user or operator of a client computer system and may be an employee of an organization that utilizes a computing resource service provider 202 to interact with various forms of data, such as through one or more of a contact service 210, front end 208, and/or data storage service 242. In some cases, computing device 204 may be associated with the computing resource service provider 202, such as may be provided by or through a contact service or other computerized service 210. In these cases, the computing device 204 may be operated by a human operator or user, such as may be referred to generally as an agent. In other aspects, the agent may be fully automated, including textual and audio communications (e.g., a bot). In some cases, the agent 204 may access various services and data provided by the computing resource service provider 202 to facilitate resolving issues with external customers, such as may also interact with computing resource service provider 202 via requests 252 through customer device 250, also over a network, such as network 206. For example, an agent 204 may communicate with a customer through the contact service 110 and may access a control interface of a configuration service 212 of the contact service 210 to obtain information to help a customer resolve one or more issues with an underlying application or service, such as other $3^{rd}$ party system or application, including various customer relationship management (CRM) systems.

In some cases, the front end 208 may receive the request 214, 252 and direct it to the appropriate service. The front end 208 may be a system including a set of web servers (e.g., a single web server or a set of web servers which may be managed by a load balancer) provided by the computing resource service provider 202. Web servers of the front end 208 may be configured to receive various requests and data and to process them according to one or more policies associated with the service. In some examples, devices 204, 250 use client software that is configured to establish a client-server relationship with a service of a computing resource service provider 202. A client 204, 250 may connect to a service via front end 208, which receives requests from clients and routes them to backend services. Front end 208 may interface with one or more of a contact service 210, and/or a data storage service 242 and/or other services offered by a computing resource service provider 202 to its customers. In at least one embodiment, client 204 interacts with a GUI to interact with various data provided by or through the computing resource service provider 202, and client-side software translates the GUI setup to a web service API request which is transmitted from the client computer system 204 to front end 208 via a network 206. In an embodiment, the network 206 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 206 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. A computing resource service provider 202 described herein may be implemented using techniques described below in reference to FIG. 8. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 202 may provide data storage through a data storage service 242, 228, 240 to store and manage large volumes of data, including text, image, and other data. The data storage service 242, 228, 240 may store various data, such as may be organized into various accounts or profiles. In some aspects, the data storage service 242, 228, 240 may store various data used and/or modified by the contact service 210 to route requests to various queues and modify one or more parameters of different queues captured in queue profiles 244 to improve or optimize throughput of processing requests. In some aspects, the data service 242, 228, 240 may also store routing profiles 248, which may define any number of queues that requests that fall within the routing profile can be routed to. A routing profile 248 may define what type(s) of channels the routing profile supports (e.g., one or more of voice, chat, or task), and/or identifiers of queues that are within the routing profile that may be assigned to agents. In some cases, each queue profile may include various information, such as a priority value, a visibility threshold and in some cases, a time-to-service level (SL) goal. In some aspects, the data storage service 242 may additionally store agent or resource profiles 246. An agent profile 246 may contain various information pertaining to an individual agent, or alternatively a resource, such as may be used by the contact service 210 to pair agents with different routing profiles 248. In some cases, an agent profile 246 may include an indication of proficiency with respect to a certain type of issue (e.g., proficiency level of 4/5 in sales, expenses, database, and so on).

Data storage service 242, 228, 240 may be an on-demand data storage service, such as an object-based data storage service that services API requests to store and retrieve data objects synchronously, and may be configured to store various forms of data and media, and other data structures generated and updated by the contact service 210. The data storage service 242, 228, 240 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 242, 228, 240, may be organized into data objects, in one or more logical data containers. The data storage service 242, 228, 240 may include one or more data objects, which may have arbitrary sizes and may, in some instances, have constraints on size. Thus, the data storage service 242, 228, 240 may store numerous data objects of varying sizes. The data storage service 242, 228, 240 may operate as a key value store that associates data objects with identifiers of the data objects which may be used by the contact service 210 to retrieve or perform other operations in connection with the data objects stored by the data storage service 242, 228, 240. Access to the object-based data storage service 242, 228, 240 may be through application programming interface (API) calls to the service or via an interface, such as a graphical user interface (GUI). Access to the data storage service 242, 228, 240 may be through application programming interface (API) calls to the service, for example from client device 204, 250 directly or through the computing resource service provider 202 and/or front end 208.

It should be appreciated that the data storage service 242, 228, 240 may additionally or alternatively provide non-object based data storage, such as block data storage, table-oriented data storage, relational databases, file-based storage, and the like. The data storage service 242, 228, 240 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 202 may also provide a contact service 210. The contact service 210 may be a collection of computing resources, including physical resources, virtual resources, or combinations thereof, configured to obtain, direct, and otherwise manage various communications streams from or between various computing devices, such as audio stream between an agent computing device 204 and various customers of the contact service 210, such as through customer computing device 250. In some examples, the contact service 210 may provide automated or partially automated communications to computing devices, such as text or audio communications, to one or more computing devices 204. In some cases, contact service 210 may facilitate establishing and managing communication channels between various computing devices 204, 250, such as across different regions 218, 230. In some cases, the contact service 210 may provide omnichannel communications. For example, text messaging or chat, voice contact, and/or video contact may be dynamically offered, based on such factors as customer preference and estimated wait times. The contact service 210, in some aspects, can integrate with one or more other services, to provide managed communication channels to users of the one or more services.

The contact service 210 may provide for a wide range of communication services to a variety of computing devices. In some examples, the contact service 210 may operate as a contact center, such as for one or more web-based businesses, retailers, etc. In other cases, the contact service 210 may provide communication services to any number of different organizations, such as health related organizations, retail, construction, legal services, etc. It should be appreciated that the techniques described herein have a broad range of applications, and that the above-mentioned use cases are only given by way of example.

In some aspects, the contact service 210 may include one or more control interfaces of a configuration service 212. The control interface of the configuration service 212 may provide a user interface (UI) or graphical user interface (GUI) to a computing device or agent 204 associated with the contact service 210, to aid in establishing and managing communication channels with client computing devices 250. In some cases, the control interface 212 may provide a dashboard to facilitate accessing customer data, such as one or more profiles linked to a specific customer or account. In yet some cases, the control interface 212 may provide a means for various agents and other entities associated with the contact service 210 to access routing profiles, queue information, and agent assignments to different queues, as will be described in greater detail below.

In some cases, the control interface/dashboard 212 may also provide an interface to facilitate managing various communication channels, various contact flows 214, and/or various queues 224, 236 (per region/instance). A contact flow 214 may encompass one or more menu options and routing directions (e.g., automated routing instructions) to respond to a customer inquiry, such as may be received from a computing device 204, 250 in the form of a text or audio stream. A contact flow 214 may be contained in a data structure, which is processed when a communication channel is established, and may include different routing instructions, pointers to different audio recordings, text responses, and the like. In some cases, a contact flow 214 may include one or more automated responses, recorded menu offerings, etc., as will be appreciated by those having skill in the art. The contact service 210 may provide any number of different contact flows 214 to handle various customer inquiries. In some cases, contact flows may be defined contact service-wide. In other cases, contact flows may be defined per region 218, 230 and/or per instance 220, 230.

In some optional cases, the contact service 210 may include an arbitration service 216, which may be a collection of computing resources that resolve conflicts and make determinations at to agent assignments to different contact requests across different regions 218, 230 and/or instances 220, 232. In some cases, the arbitration service 216 may make enforce a set of selection rules for prioritizing and selecting which agents can be assigned to process which contact requests in various queues. In some cases, the arbitration service 216 may collect requests to assign agents to different queues to process contact requests for a config- urable time period prior to making agent assignments, such as to ensure that agent assignment requests from different regions having different latencies may be collected, such that closer regions or instances are not favored for selection. In some cases, the arbitration service 216 may enforce a set of rules for assigning agents, such as processing oldest request first, based on priority values associated with different requests/customers or accounts, service level agreements (SLAs) for different requests/customers or accounts, and so on. In some cases, different rules may be enforced for agents getting assigned to different regions, depending on which region the agent is primarily associated with. In some cases, as will be described in greater detail below, the arbitration service 216 may receive agent assignment requests or an arbitration request to resolve an agent assignment from one or more agent management proxy services 226, 238 from different instances 220, 232 from different regions 218, 230. While typically, an agent management proxy service for a a given region will make decisions as to which agents from that region are released to handle contact requests from other regions, the arbitration service 216 may provide for an additional layer of decision making when an agent is selected for multiple assignments that conflict.

As illustrated in FIG. 2, the contact service 210 may provide instances 220, 232 of the contact service 210 in different regions 218, 230. In some aspects, each instance 220, 230 may include all the components and computing resources, data stores, etc., of a full independent contact service (e.g., hardware resources, virtual resources, and/or combinations thereof), such that each instance 220, 232 can operate on its own to receive contact requests, assign those contact requests to different queues 224, 236 via a separate routing service 222, 234. In some aspects, each instance 220, 232, may include its own data storage resources 228, 240, which may store one or more of queue profiles 244, agent profiles 246, and/or routing profiles 248, as described in greater detail above. In yet some cases, each instance 218, 230 may include or provide one or more of its own con- figuration service 212, and/or contact flows 214. IT should be appreciated, that while only two instances 220, 230 associated with two different regions are illustrated in FIG. 2, that the described systems and techniques equally apply to at least two, or multiple instances spread across any number of different regions.

Each instance 220, 232, may provide a set of queues 224, 236, to which issues and/or action items (e.g., generally referred to herein as requests) may be assigned. A queue 224, 236 may be a storage location where an item or data structure is placed, typically temporarily, to be processed at a later time. The various queues 224, 236 may be linked or associated with one or more contact flows 214, such that an action item may be placed in an appropriate queue 224, 236 based on the action that needs to be taken to resolve or close the action. In some cases, the action to be taken may also correspond to a contact flow 214.

Each instance 220, 232, may provide a routing service 222, 234. Each routing service 222, 234 may be a collection of computing resources, including physical resources, vir- tual resources, or combinations thereof, configured to route agents or other resources to queues to process requests. In some cases, routing service 222, 234 may also be configured to modify one or more parameters of different queue profiles 224, 236 to improve or optimize agent assignments to the various queues in one or more routing profiles. Each routing service 222, 234 may implement one or multiple processes, based on various rules, to assign agents to contact requests, such as to meet customer SLAs.

In some aspects, each routing service 220, 232 may provide APIs to update availability of agents and contacts, and may be responsible for matching contacts to the appro- priate available agents. The matching may be based on agent profiles, routing profiles, and queue profiles as described above. In some examples, configuration service 212, which may also be provided by the contact service 210/each instance 220, 232, may enable administrators/developers to configure various parameters of the routing service 220, 232, via API calls. In some cases, this may include setting or modifying one or more of a priority value, a visibility threshold, and/or a SL goal of one or more queues. In yet some cases, the configuration service 212 may provide one or more user interfaces for displaying or otherwise present- ing or transmitting performance metrics of various queues, and/or viewing modifications made to the queue parameters such as skip probability values, modified visibility thresh- olds, and so on.

Each instance 220, 232, may also provide a proxy 226, 238 (also referred to herein as an agent management proxy service), which may coordinate with other proxy services to coordinate assigning agents across different instances 220, 232, and/or regions 218, 230, to increase agent utilization while decreasing wait times for contact requests to get processed (e.g., improve meeting customer SLAs). Various processes for requesting and assigning agents to process contact requests from different regions/instances will be described in greater detail below. In some cases, when a change is made to at least one of an agent profile, a queue profile, or a routing profile, or availability of an agent changes, the responsible instance/region for the agent (e.g., the epoxy service of that instance) may send the change to other instances/regions, to ensure that the agent information is up to date to ensure that agents may be assigned accurately based on availability. In some cases, this may include, for example one proxy service 226 sending updates to another proxy service 238, either upon a update or change being detected, periodically, etc. In some examples, additionally or alternatively, a current list of available agents with skillset information (e.g., which may be captured in one or more routing profiles) may be published in location accessible by the various instances 220, 232 of various regions 218, 230, such as via an interface provided by the configuration service 212. In some cases, a centralized data storage, such as data storage service 242, may store and update this information.

Figure 3A:
FIGS. 3A and 3B illustrate example interactions between two contact service instances in different regions coordinating routing agents to different contacts using a proxy service, according to at least one embodiment.
Figure 3B:
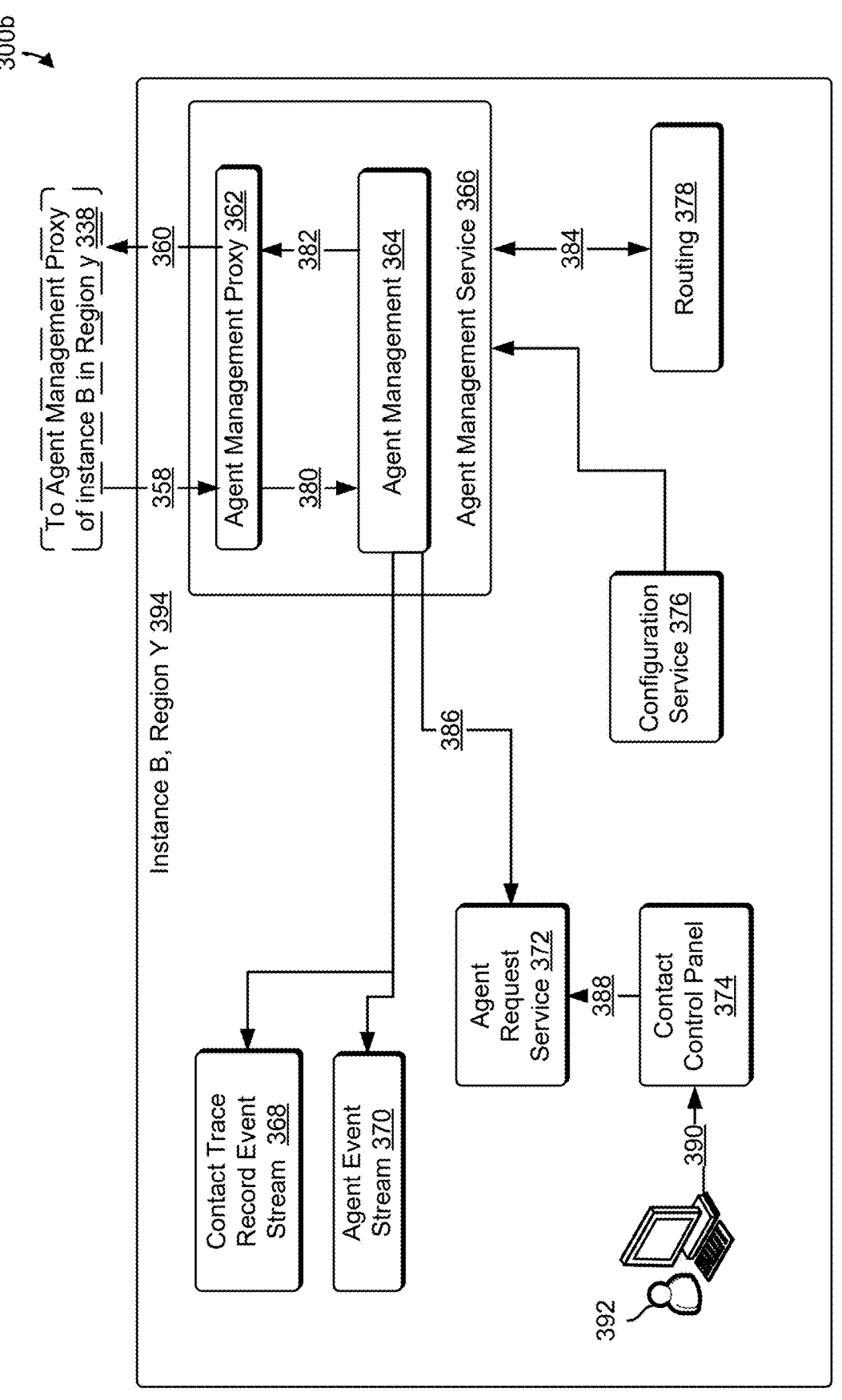

FIGS. 3A and 3B illustrate example interactions 300a and 300b between two contact service instances in different regions coordinating routing agents to different contacts using a proxy service. Services and components illustrated in FIGS. 3A and 3B 302, 602 may be examples of or incorporate one or more aspects of similar named services and components described above in reference to FIG. 2. In some aspects one or more instances 302, 394 may be provided by a contact service, such as contact service 210 described above. In some cases, one or more instances 302, 394 may coordinate with a centralized contact service 306.

As illustrated, control plane services of the contact service/instances 302, 394 may be defined to include a configuration service 332, 376 and/or an authorization control plane service (not illustrated). Data plane services may include agent management services 344, 366, routing services 318, 378, contact management 322, flow execution 322, and media services 308, a metrics services, such as real-time and historical metrics (not illustrated), and front-end services, including an admin website or interface, and a contact control panel 374.

In some aspects, instance 394 may be a replica of instance 302 (or vice versa), to ensure that agent profiles routing profiles, queue profiles, and/or configurations setting and parameters are synchronized between instances 302, 394 to enable cross assigning of agents between the different instances. In other cases, these various profiles and parameters may be synchronized after instances 302 and 394 have been created/instantiated. In some cases, replication of one or more instances 302, 394 may utilize other contact service functionality, such as resilience measures that enable failover from one instance that experiences a failure/loses connectivity, etc., to another instance, where agents from the backup instance may assume responsivities of agents of the failed instance. It should be appreciated that the described techniques may operate in conjunction with such instance failover measurements and features.

In some aspects, on the contact side, contacts submitting requests will remain in the cell or region where the request is initiated ensure compliance with regional data sovereignty and telecom requirements. In some cases, this may result in the routing service of the instance where the contact originated may retain routing authority over the contact. In yet some cases, this may result in data associated with the contact request, both data stored by the contact service and data generated by processing the request, may be stored and retained by data storage of the instance where the contact originated. While on agent side, agent availability will be shared across all the linked instances 302, 394 so that an agent can be routed to any contact of the linked instances.

In various examples, contact management may include the following operations. First, a contact can be initiated from any of the linked instances 302, 394, such as contact 304 initiating contact request 340 initiated with instance 302. In the example illustrated, the contact request 340 may be over a voice/telecom connection 310. However, it should be appreciated that various other communication platforms and technologies may be provided by the contact service, such as chat or email 312, work items 314 via various channels, and/or tasks 316, such as may be generated by the contact service in response to receiving a request (e.g., chat or email). The contact may be stored in or with the contact management component 322 provided by instance 302. The contact request 340 may then be passed to internal services in same cell/region/instance 302, such as media service 308 to connect with an agent, flow execution 320 for contact flow execution. The contact request may be placed into a specific queue with optional routing plan (e.g., based on attributes of the request such as proficiency requirements for an agent to process the request) by the routing service 318. In some aspects, one or more of a contact trace record 324 or stream 328 or contact event stream 330 may be generated from the originating cell/instance 302 itself, such as may be sent to the centralized contact service 306 or another instance 362, to ensure that contact requests are known to be assigned to different agents in different regions. In some aspects, record 324, and/or streams 328, 330 may be sent to a metrics service, to enable real time or near-real time monitoring of various data relating to incoming contact requests, agent assignments, processing times for different requests, and the like.

The cross region agent assignment techniques may be provided via an agent management service 334, 366/proxy service 338, 362 provided by each instance/region 302, 394. The contact initiated from an instance can be routed to any agent from any linked instances (e.g., between instances 302 and 394 illustrated in FIGS. 3A and 3B). In order to accomplish this, agents may be made "global," such that even though an agent in staffed in a single instance/region, it will made available to all regions where other linked instances are present, by agent management services 334, 366/proxy services 338, 362.

As illustrated, for contact request 340, an agent management proxy service 338, upon determining, such as from the routing service 318, that no agents are available to process the request 340, may communicate with the an agent management service 366/proxy 362 of instance 394, at operation 358, to see if an agent associated with instance/region 394 is available to process the request (e.g., sooner than an agent will become available in instance/region 302). Agent management proxy service 362 may receive the request, at operation 358. Internally, agent management proxy 362 may verify with the agent management component 364, if an agent is available that has the required skillset to process the contact request 340. The agent management component 364 may communicate with an agent request service 372, which may be a process for checking to see if any agents are online (e.g., logged into the system), and available to process requests. An agent, such as agent 392 may log into instance 394 at operation 390 via a contact control panel 374. The agent request service 372 may communicate with the contact control panel at operation 388 to determine that agent 392 is available and possess the required skillset to handle the contact request. The routing service 378 may then make a determination as to whether the agent can be released to handle contact request 340. In some cases, the determination may be made based on various criteria, such as latency requirements to process the request, arbitration criteria that may include a ruleset to determine when an agent should be assigned in light of one or more conflicts (e.g., based on oldest request, SLA of a request, etc.), etc.

Once the routing service 378 release/approves the agent 392 to take the contact request 340, at operation 384, the agent management component 364 updates the agent availability to the agent management proxy 362 at operation 382 (to ensure that the agent is not overbooked or assigned to another contact request). The agent management proxy service 362 then communicates that agent 392 is approved to handle the contact request 340, at operation 350, to the agent management proxy service 338. The agent management proxy service 338 may the communicate with agent management component 336 and routing service 318, at operation 356 and 354 to cause the routing service 318 to assign agent 392 to contact request 340 and update availability. The routing service 318 may then communicate with the media service 308 to establish a communicate channel/send the work item or task over to the agent 392 to process the contact request 340. In some cases, the media service 308 of the initiating instance 302 may retain control over the communication channel, and may ensure that data relating to the request 340 (either account information and/or information generated by processing the request) is stored/retained within instance 302, and not saved or stored outside of instance/region 302.

In some examples, the routing service that is associated with an instance where the contact originates will make an initial determination as to which agent to tentatively assign to the contact, based on agent availability information shared by other instances in other regions, such as region 394. In some cases, each region may publish availability information/updates or state information of different agents, such as illustrated in region 304, as agent management component 364 publishing different states or actions relating to agents to an agent event stream 370. As illustrated, agent management 364 may publish that agent 392 is online and available, that agent 392 has been assigned to process contact 304, and/or when the agent has completed processing the contact request and is available for assignment.

In another example, agent 392 becomes available in instance B 394. CCP 374 communicates to agent request service 372, which then communicates to agent management service 366 which then communicates to routing service 378. Agent management service 366 also communicates this to proxy service 338 which then communicates to routing 318. So now both routing services 318 and 378 know that the agent 392 has become available. Routing service 318 may place contact 304 in a queue of instance 302. Routing service 318 (as it has information of both agent and contact) determines that agent 392 can handle contact 304. It communicates this join decision to proxy service 338. Proxy service 338 then forwards the request to proxy service 362 as that is the region where agent 392 resides. Proxy service 362 sends the join decision to agent management 364 (internally within the agent management service 366). Agent management 364 communicates with agent request service 372 which then shows the agent 392 that there is a contact matched and waiting. Agent 392 may accept the contact through CCP 374. The accept signal is routed from CCP 374 to agent request service 372 to agent management 364. Agent management 364 then communicates with the media services 308 though the proxy services 362, 338 to establish the communication channel.

Figure 4:
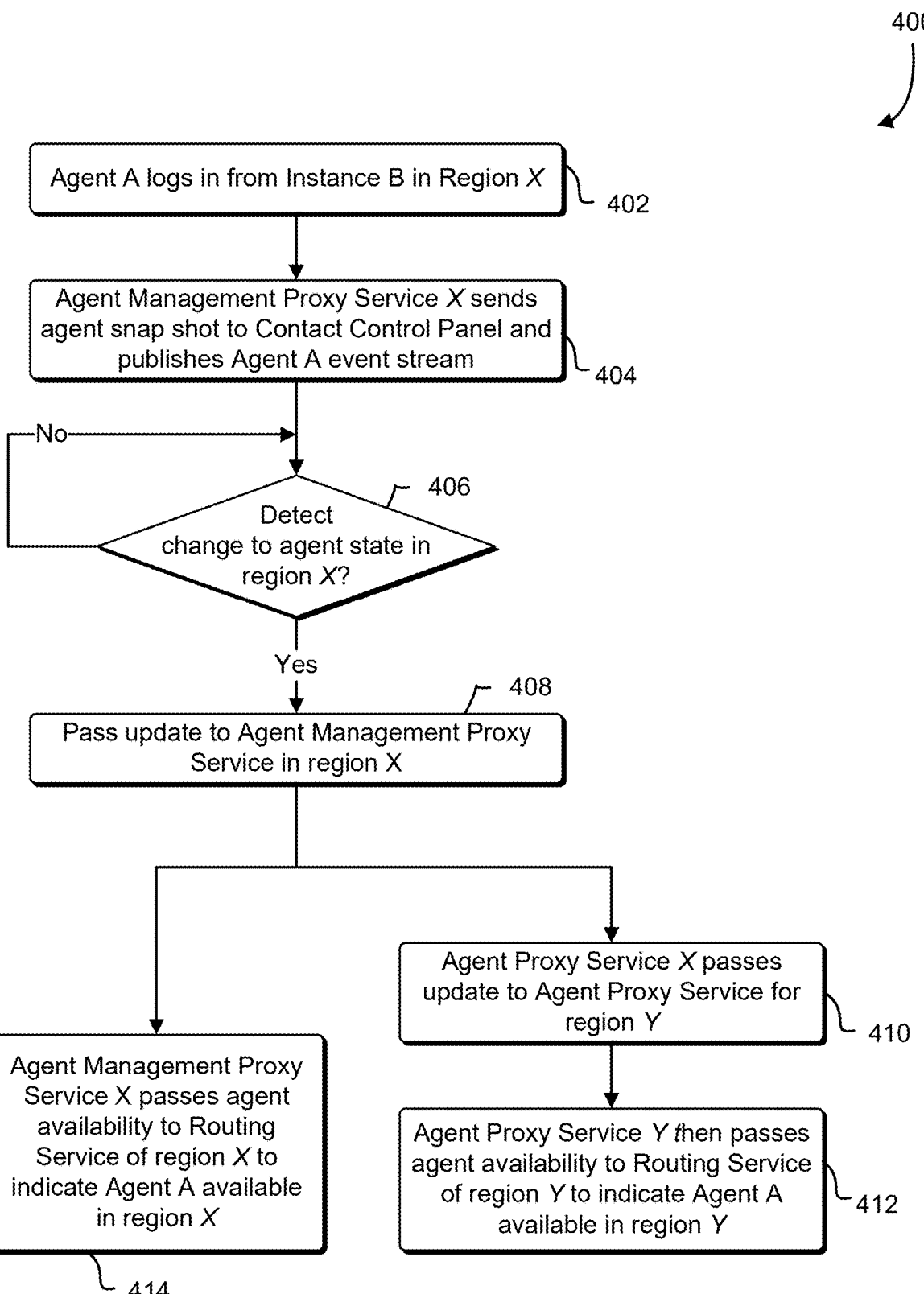
FIG. 4 illustrates an example process for sharing/publishing contact service agent for routing agents between different regions of a contact service, according to at least one embodiment.

FIG. 4 illustrates an example process 400 for sharing/publishing contact service agent for routing agents between different regions of a contact service, such as may be performed by system 200, and/or the system described above in reference to FIGS. 3A and 3B.

Process 400 may begin at operation 402 where agent A may log into instance B in region X. An agent management proxy service of region X may send an agent snapshot (in some cases, including agent profile information of agent A) to the contact control panel of region X, and may publish agent A to the event stream of region X, at operation 404. In some cases, process 400 may also monitor for changes to agent state, profile information, etc., at operation 406. If a change is detected, the update/new agent profile may be sent to the agent management proxy service of region X, at operation 408.

Agent management proxy service of region X may then communicate the agent update to an agent management proxy service for a different region Y (e.g., served by a different instances C of region Y), at operation 410. Agent management proxy service Y may then pass agent availability to routing service of region Y to indicate agent A available in region Y, at operation 412. Similarly, the agent management proxy service of region X may communicate the agent update to the routing service of region X, to indicate that agent A is available for assignment, at operation 414. In some examples, agent management proxy service of a given region may periodically broadcast either updates or current state information of available/logged in agents, to ensure that agent information is up to data and accessible by all linked instances in different regions of the contact service.

FIG. 5 illustrates an example process 500 for linking a contact service agent in one region to a contact request origination in another region, such as may be performed by system 200, and/or the system described above in reference to FIGS. 3A and 3B.

Following with the example of FIG. 4, where a contact request originates in region Y and an agent is located in region X, process 500 may begin at operation 502 in which the routing service in region Y may pass join decisions to agent management proxy service in region Y. The agent management proxy service in region Y may then pass join decision agent management proxy service of region X, which may be the primary region for the agent (e.g., Agent A), at operation 504. The agent management proxy service of region X may enforce any constraints or limitations on Agent A, at operation 506. If the agent management proxy service of region X determines that the join can proceed, at operation 508, the process 500 may proceed to operation 512, in which the contact operations may be passed to region Y via agent management proxy service of region X to media service of Region Y.

Figure 6:
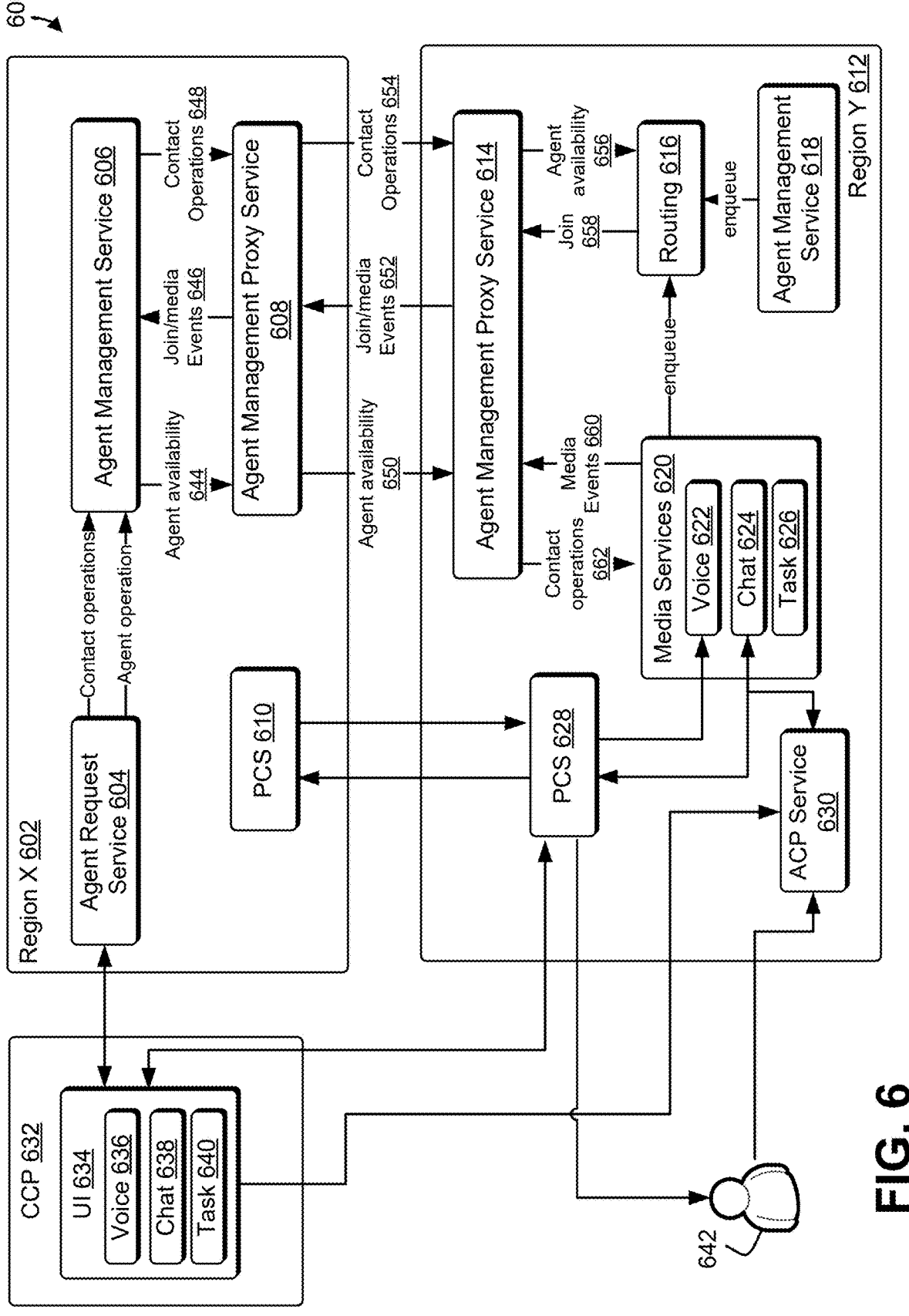
FIG. 6 illustrates another example of interactions between two contact service instances in different regions coordinating routing agents to different contacts using a proxy service, according to at least one embodiment.

FIG. 6 illustrates another example of interactions 600 between two contact service instances in different regions coordinating routing agents to different contacts using a proxy service. Services and components illustrated in FIG. 6 may be examples of or incorporate one or more aspects of similar named services and components described above in reference to FIG. 2 and/or FIGS. 3A and 3B. In some aspects one or more regions 602, 614 may be examples or of incorporate one or more aspects of instances 302, 394 described above in reference to FIGS. 3A and 3B provided by a contact service.

As illustrated, an agent may interact with the contact service through a user interface 634, such as provided by a contact control plane (CCP) or panel 632, which may support any of a number of communication channels, such as voice 636, chat 638, task 640, etc. In some cases, a persistent connection service (PCS) 610 and 628 of regions 602, 612 may interface directly with CCP 632 and media services 622 of region 614 to facilitate connecting an agent using UI 634 with a contact requestor 642, in coordination with the proxy management 608, 614 of the respective region. In other cases, CCP 632 may connect directly the endpoint of another region, such as contact requestor 642 of region 612.

As an example, an agent associated with region X 602 may be connected to respond to a contact request from requestor 642 in region Y 612. In this example, instances/ regions 602, 612 may be linked, such that they can share agents to respond to contact requests. Agent management service 606 may send agent availability events 644, 650, 656 to local routing (not illustrated) and linked region's routing service 616 via agent management proxy service 608 and 614.

A contact 642 initiated in linked region 612 gets routed to agent in region 602. Routing service 616 may call the agent management proxy service 614 for a join 658, which looks at the agent's region 602 and sends the join request to the appropriate region's agent management proxy service 608 at operation 652. For contact handling, the local agent management service 606 executes it's business logic and uses Agent management proxy service 608 to make cross region contact handling calls to media services 620. Contact handling operations may include reserve, join, accept, reject, hold, resume, disconnect, etc.

In some aspects, an agent may be logged in to only one region as an active region, such as region 602, and via the described techniques, will be able to handle contact from multiple regions, including region 612. CCP 632 may communicate with local agent request service 604 for agent and contact handling operations. Agent request service 604 may then communicate with local agent management service 606. In some cases, the CCP 632 may open a websocket connection with local media services (e.g., 636, 638, 640) of region 602.

In some cases, a region may provide a metrics service (not illustrated), such that may aggregate and present historical metrics for contacts of the contact service. Many internal services may send the metrics service events as the contact works its way through the system, and when the contact is terminated it forms the contact trace record by aggregating all the events together to calculate details about the contact, and persists the historical record so that reports across time periods can be provided. In some cases, the metrics service may also provide real-time knowledge about the state of the system-how many calls are in a particular queue, how many agents are available or busy within a particular queue, etc. In yet some cases, a region or instance may provide a frontend service, such as a web interface, which may be built on top of the configuration service, that allows users to configure their contact service resources. It may also expose various ways to pull metrics reports, both real-time and historical. As described above, CCP 632 may be the main interface that agents use to accept, reject and transfer inbound tasks, chat and voice contacts. In some aspects, CCP 632 may be implemented using an open-source JavaScript library called StreamJS which handles all of the interactions with the contact service backend services.

In some aspects, real-time or near-real-time metrics for queue and proficiencies across all linked instances may be addressed via the contact control panel (CCP) 632. In some cases, CCP 632 may enable managers or other users to initiate monitoring on contacts in any linked instance or region. In some cases, this may be facilitated via using contact request metadata to compile various metrics and present them to a user of CCP 632.

FIG. 7 illustrate another example process 700 for linking a contact service agent in one region to a contact request origination in another region to process a contact request. In some aspects, process 700 may be performed in whole or in part by system 200, the system described above in reference to FIGS. 3A and 3B, and/or the system described above in reference to FIG. 6. In some aspects, process 700 may incorporate one or more aspects of process 400 and/or 500 described above.

In some examples, process 700 may begin at operation 700, in which a first contact service instance associated with a first region of a contact service may obtain a contact request associated with a contact requestor located with the first region. In some cases, the contact request may include a set of attributes that define the request. At operation 702, upon selecting, by the first contact service instance, an agent associated with a second contact service instance associated with a second region to process the contact request based on the attributes of the contact request, the second contact service instance may send a request to the second contact service instance to release the agent to process the request. At operation 704, the first contact service instance may obtain an indication from the second contact service instance that the agent associated with the second region is approved to process the contact request. At operation 706, the first contact service instance may cause a communication channel to be established between the contact requestor in the first region and the agent in the second region to process the contact request, as described in greater detail above.

In some cases, at least one or more (or two or more of in some examples) of sending the request to the second contact service instance at operation 704, obtaining the indication that the agent is approved to process the contact request at operation 706, and causing the communication channel to be established between the contact requestor in the first region and the agent in the second region at operation 708 may be performed by an agent management proxy service provided by the first contact service instance.

In some cases, process 700 may additionally include causing a routing service provided by the first contact service instance associated with the first region to determine that the agent associated with the second region satisfies a set of criteria to process the contact request based on the attributes of the contact request; and assign the contact request to a first queue in the first region based on a routing profile of the first agent satisfying the attributes of the contact request. In some cases, the set of criteria may include at least a latency requirement for responding to the contact request. In yet some cases, the set of criteria may include at least an arbitration criteria for negotiating assigning agents of the second region to contact requests originating from the first region.

In some cases, process 700 may additionally include at least one of receiving, by the first contact service instance, a first update to at least one agent managed by the second contact service instance in the second region; sending, by the first contact service instance, a second update to at least one second agent managed by the first contact service instance to the second contact service instance to enable the second contact service instance to assign the at least one second agent to a queue in the second region; or publishing the second update to an interface shared between the first contact service instance and the second contact service instance to enable the first contact service instance and the second contact service instance to assign the at least one agent to respond to the contact request or another contact request in at least one of the first region or the second region. In yet some cases, process 700 may additionally or alternatively include broadcasting a list of available agents associated with the first geographical region to the second contact service instance.

In some examples, process 700 may include accessing data to respond to the contact request from the first contact service instance in the first region. In some cases, this may be performed to maintain data sovereignty of the data accessed to process the contact request by not storing the data outside of the first region.

Figure 8:
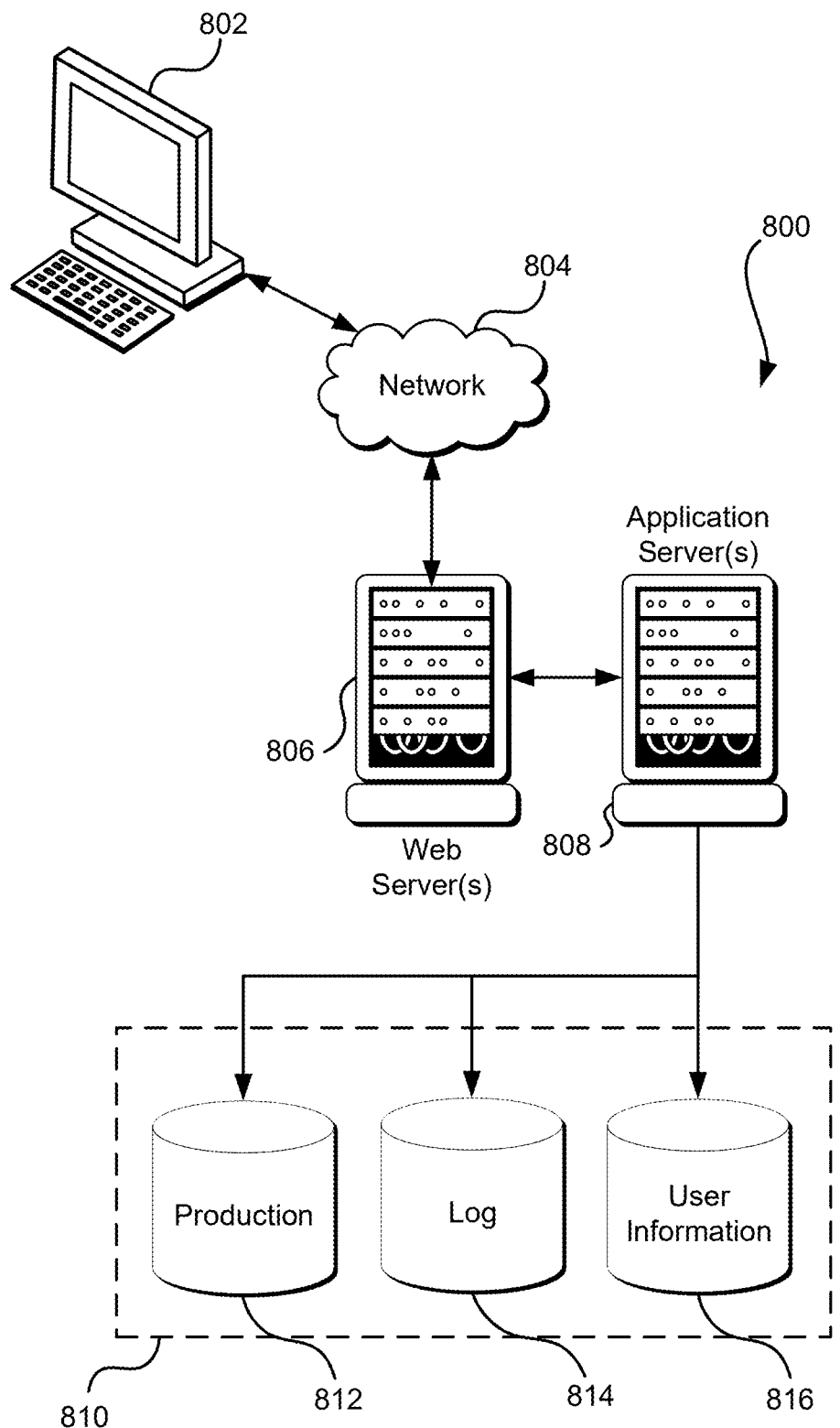
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. A system, comprising:
a first contact service instance serving a first geographical region, comprising one or more processors;
memory that stores computer-executable instructions that, if executed, cause the one or more processors to:
obtain a contact request associated with a contact requestor located in the first geographical region, the contact request comprising a set of attributes that define the request;
determine, by a first routing service provided by the first contact service instance, that a first agent associated with a second geographical region satisfies a set of criteria to respond to the contact request based on the attributes of the contact request;
communicate, by a first agent management proxy service provided by the first contact service instance, a request to assign the first agent to the contact request, to a second agent management proxy service provided by a second contact service instance serving the second geographical region; and
upon receiving confirmation from the second agent management proxy service, the confirmation indicating that the first agent is available to be assigned to process the contact request, cause the second agent management service to facilitate establishing a communication channel between the contact requestor in the first geographical region and the first agent in the second geographical region to process the contact request in a first queue, wherein data accessed to process the contact request is only stored within the first region to comply with a data sovereignty policy.

2. The system of claim 1, wherein the computer-executable instructions that, if executed, further cause the one or more processors to:
receive, by the first agent management proxy service, an update to at least one agent managed by the second agent management service in the second geographical region; and
responsive to receiving the update, communicate the update to the first routing service to update a list of available agents maintained by the first routing service.

3. The system of claim 1, wherein the computer-executable instructions that, if executed, further cause the one or more processors to:
receive, by the first agent management proxy service, an update to at least one agent managed by the second agent management proxy service in the second geographical region; and
publish the update to an interface shared between the first contact service instance and the second contact service instance to enable the first routing service and a second routing service provided by the second contact service instance to assign the at least one agent to a queue in at least one of the first geographical region or the second geographical region.

4. The system of claim 1, wherein the computer-executable instructions that, if executed, further cause the one or more processors to:
periodically broadcast a list of available agents associated with the first geographical region to the second agent management proxy service.

5. The system of claim 1, wherein the computer-executable instructions that, if executed, further cause the one or more processors to:
in processing the contact request, access account data associated with the contact request from a data store associated with the first geographical region to comply with at least one data sovereignty requirement associated with the first geographical region.

6. The system of claim 1, wherein the set of criteria comprises at least one of a latency requirement for responding to the contact request or an arbitration criteria for negotiating assigning agents of the second geographical region to contact requests originating from the first geographical region.

7. A computerized-method comprising:
obtaining, by a first contact service instance associated with a first region of a contact service, a contact request associated with a contact requestor located with the first region, the contact request comprising a set of attributes that define the request;

upon selecting, by the first contact service instance, an agent associated with a second contact service instance associated with a second region to process the contact request based on the attributes of the contact request, sending a request to the second contact service instance to release the agent to process the request;

obtaining, by the first contact service instance, an indication from the second contact service instance that the agent associated with the second region is approved to process the contact request; and causing, by the first contact service instance, a communication channel to be established between the contact requestor in the first region and the agent in the second region to process the contact request, wherein data accessed to process the contact request is not stored outside of the first region to comply with a data sovereignty policy.

8. The computer-implemented method of claim 7, wherein at least two of sending the request to the second contact service instance, obtaining the indication that the agent is approved to process the contact request, and causing the communication channel to be established between the contact requestor in the first region and the agent in the second region is performed by an agent management proxy service provided by the first contact service instance.

9. The computer-implemented method of claim 7, further comprising:

causing a routing service provided by the first contact service instance associated with the first region to determine that the agent associated with the second region satisfies a set of criteria to process the contact request based on the attributes of the contact request.

10. The computer-implemented method of claim 7, further comprising at least one of:

receiving, by the first contact service instance, a first update to at least one agent managed by the second contact service instance in the second region;

sending, by the first contact service instance, a second update, relating to at least one second agent managed by the first contact service instance, to the second contact service instance to enable the second contact service instance to assign the at least one second agent to a queue in the second region; or publishing the second update to an interface shared between the first contact service instance and the second contact service instance to enable the first contact service instance and the second contact service instance to assign the at least one agent to respond to the contact request or another contact request in at least one of the first region or the second region.

11. The computer-implemented method of claim 7, further comprising:

broadcasting a list of available agents associated with the first region to the second contact service instance.

12. The computer-implemented method of claim 7, further comprising:

accessing data to respond to the contact request from the first contact service instance in the first region.

13. The computer-implemented method of claim 12, further comprising:

modifying and storing the data accessed to process the contact request within the first region.

14. The computer-implemented method of claim 9, wherein the set of criteria comprises at least a latency requirement for responding to the contact request.

15. The computer-implemented method of claim 9, wherein the set of criteria comprises at least an arbitration criteria for negotiating assigning agents of the second region to contact requests originating from the first region.

16. One or more non-transitory computer-readable storage media storing thereon executable instructions that, as a result of being executed by one or more processors of a computer system, cause the computer system to at least:

obtain, by a first contact service instance associated with a first region of a contact service, a contact request associated with a contact requestor located with the first region, the contact request comprising a set of attributes that define the request;

based on obtaining, by an agent management proxy service associated with the first region, a selection of an agent for processing the contact request, the agent associated with a second contact service instance associated with a second region and based on the attributes of the contact request, send a request to the second contact service instance to release the agent to process the request;

obtain, by agent management proxy service, an indication from the second contact service instance that the agent associated with the second region is approved to process the contact request; and cause, by the first contact service instance, a communication channel to be established between the contact requestor in the first region and the agent in the second region to process the contact request, wherein data accessed to process the contact request is not stored outside of the first region to comply with a data sovereignty policy.

17. The one or more non-transitory computer-readable storage media of claim 16, wherein the instructions further include instructions that cause the computer system to at least one of:

receive, by the first contact service instance, a first update to at least one agent managed by the second contact service instance in the second region; or publish the first update to an interface shared between the first contact service instance and the second contact service instance to enable the first contact service instance and the second contact service instance to process at least one additional contact request by assigning the at least one agent to the at least one additional contact request.

18. The one or more non-transitory computer-readable storage media of claim 16, wherein the instructions further include instructions that cause the computer system to:

access data to respond to the contact request from the first contact service instance in the first region.

19. The one or more non-transitory computer-readable storage media of claim 16, wherein the instructions further include instructions that cause the computer system to:

cause a routing service associated with the first region to determine that the agent associated with the second region satisfies the set of criteria to respond to the contact request based on the attributes of the contact request.

20. The one or more non-transitory computer-readable storage media of claim 16, wherein the instructions further include instructions that cause the computer system to:

periodically broadcast a list of available agents associated with the first region to the second contact service instance.

* * * * *